US012789451B2

(12) United States Patent
Prakash et al.

(10) Patent No.: US 12,789,451 B2
(45) Date of Patent: Nov. 10, 2026

(54) MULTI-MATERIAL DEPOSITION ARRANGEMENT AND METHOD FOR DEPOSITION EXTRUSION

(71) Applicant: Brinter AM Technologies Oy, Turku (FI)

(72) Inventors: Dhayakumar Rajan Prakash, Turku (FI); Tomi Kalpio, Turku (FI)

(73) Assignee: Brinter AM Technologies Oy, Turku (FI)

( * ) Notice: Subject to any disclaimer, the term of this patent is extended or adjusted under 35 U.S.C. 154(b) by 0 days.

(21) Appl. No.: 17/990,403

(22) Filed: Nov. 18, 2022

(65) Prior Publication Data

US 2024/0165875 A1 May 23, 2024

(51) Int. Cl.

*B29C 64/209* (2017.01)
*B29C 64/241* (2017.01)
*B33Y 10/00* (2015.01)
*B33Y 30/00* (2015.01)
*B33Y 70/10* (2020.01)

(52) U.S. Cl.

CPC .......... *B29C 64/209* (2017.08); *B29C 64/241* (2017.08); *B29C 2793/009* (2013.01); *B33Y 10/00* (2014.12); *B33Y 30/00* (2014.12); *B33Y 70/10* (2020.01)

(58) Field of Classification Search

CPC ....... B29C 64/209; B29C 64/24; B33Y 10/00; B33Y 30/00; B05C 11/1036; B05C 5/027; B05C 5/0254

See application file for complete search history.

(56) References Cited

U.S. PATENT DOCUMENTS 5,354,378 A * 10/1994 Hauser .................. B05C 13/025 118/DIG. 2
5,421,921 A * 6/1995 Gill ....................... B05C 5/0254 264/211.13

(Continued)

FOREIGN PATENT DOCUMENTS

GB 1166500 A 10/1969
WO WO-2018193306 A2 * 10/2018 ............. B33Y 50/02
WO 2021/259434 A1 12/2021

OTHER PUBLICATIONS

International Search Report and Written Opinion of the International Searching Authority issued in International Patent Application No. PCT/FI2023/050616 dated Feb. 13, 2024.

*Primary Examiner* — Nahida Sultana
(74) *Attorney, Agent, or Firm* — Ziegler IP Law Group, LLC.

(57) ABSTRACT

A multi-material deposition arrangement for deposition extrusion includes at least one first deposition-head having at least one inlet; wherein at least one inlet is configured to receive a plurality of deposition materials in at least one of a selective manner or simultaneous manner, wherein when at least one inlet receives the plurality of deposition materials in selective manner at least one first deposition-head is operable to perform layer deposition of single layer or stacked layers of individual deposition material, and when at least one inlet receives the plurality of deposition materials in simultaneous manner the at least one first deposition-head is operable to perform layer deposition of single layer or stacked layers of mixed deposition material of plurality of deposition materials.

17 Claims, 10 Drawing Sheets

(56) References Cited

U.S. PATENT DOCUMENTS

| | | | | | |
|---|---|---|---|---|---|
| 5,524,828 | A * | 6/1996 | Raterman | B05D 1/265 | 239/413 |
| 5,622,315 | A * | 4/1997 | Keane | B29C 48/313 | 239/597 |
| 5,720,820 | A * | 2/1998 | Boger | H05K 3/0091 | 118/411 |
| 11,666,936 | B2 * | 6/2023 | Parsekian | B05C 5/00 | 118/313 |
| 2007/0216728 | A1 * | 9/2007 | Ito | B41J 2/1623 | 347/48 |
| 2010/0143581 | A1 * | 6/2010 | Eldershaw | B05D 1/265 | 427/75 |
| 2011/0287171 | A1 | 11/2011 | Seo et al. | | |
| 2013/0193105 | A1 * | 8/2013 | Ciminelli | B41J 2/1603 | 156/247 |
| 2016/0136895 | A1 * | 5/2016 | Beyer | B29C 64/393 | 425/132 |
| 2016/0375463 | A1 * | 12/2016 | Svec | E04D 1/12 | 427/424 |
| 2017/0197347 | A1 * | 7/2017 | Ausen | B32B 3/16 | |
| 2017/0203507 | A1 * | 7/2017 | Leavitt | B33Y 10/00 | |
| 2017/0304858 | A1 * | 10/2017 | Leonard | B05C 5/027 | |
| 2018/0086002 | A1 | 3/2018 | Sun et al. | | |
| 2018/0215152 | A1 * | 8/2018 | Choy | B41J 2/155 | |
| 2018/0304531 | A1 | 10/2018 | Gallant et al. | | |
| 2021/0370342 | A1 | 12/2021 | Parsekian et al. | | |
| 2021/0387223 | A1 * | 12/2021 | Park | B29C 48/2556 | |
| 2023/0085121 | A1 * | 3/2023 | Lee | B05C 5/0254 | 239/592 |
| 2023/0140800 | A1 * | 5/2023 | Lee | H01M 4/0411 | 118/315 |

* cited by examiner

MULTI-MATERIAL DEPOSITION ARRANGEMENT AND METHOD FOR DEPOSITION EXTRUSION

TECHNICAL FIELD

The present disclosure relates to multi-material deposition arrangement for deposition extrusion. The present disclosure also relates to multi-material deposition method for deposition extrusion.

BACKGROUND

With the advancement in technology, the manufacturing processes have been evolving day by day. Now a days, the manufacturing processes such as multidimensional printing, bio printing, pharma printing, slot-die printing, array-based printing, subtractive manufacturing, casting process, and the like, have been used for manufacturing of various products. In this regard, each of the aforementioned manufacturing processes require a particular device to perform a unique function.

Generally, a casting tool is used for casting a film using the casting process. In this regard, during the casting process a material is poured into a hollow mould space and is left to cool and solidify to form a desired final product. The hollow mould space may be an extruder, a film casting apparatus or a slot die head associated with the casting tool. For example, the material is a molten metal, a polymer, a ceramic or a metal that changes phase from liquid or gel to a solid state thereof. However, the said casting tool is cost inefficient time consuming, and requires human intervention. Moreover, the said casting process lacks precision, thus fails to produce finished products. Furthermore, the casting tool employs the slot die head to manufacture thin films via solution processing. However, such slot head includes only one inlet and one casting area, thereby failing to manufacture complex structures with accuracy.

Typically, a 3D printer is used for manufacturing products using the multidimensional printing such as a 3D printing process. In this regard, the 3D printer uses a rapid prototyping technology and/or additive manufacturing technology. Moreover, the 3D printer typically employs adding successive layers of a printing material under computer control to create a 3D printed object within a very short period of time thus, speeding up the prototyping process. However, the conventional 3D printer fails to print the printing material accurately on a non-planar surface. Furthermore, the conventional 3D printer employs freeform reversible embedding of suspended hydrogels or "FRESH" technique. The FRESH technique allows 3D structure to be fabricated by using a support material such as a gelatin or other types of hydrogels for manufacturing complex structures such as overhanging or hollow structures. Additionally, the FRESH technique does not either allow multi-material bath use or gradient bath in a controlled manner or multi-layer use where different layers of the bath have either different materials or formulations. Currently, there exist no common manufacturing tool that could overcome the limitations of the aforementioned manufacturing tools.

Therefore, in light of foregoing discussion, there exists a need of an improved manufacturing tool having 3d printing and/or multiple casting capability for bio printing and drug printing applications.

SUMMARY

The present disclosure seeks to provide a multi-material deposition arrangement for deposition extrusion. The present disclosure also seeks to provide a multi-material deposition method for deposition extrusion. An aim of the present disclosure is to provide a solution that overcomes at least partially the problems encountered in prior art.

In a first aspect, an embodiment of the present disclosure provides a multi-material deposition arrangement for deposition extrusion, the multi-material deposition arrangement comprising:

at least one first deposition-head having at least one inlet;

wherein the at least one inlet is configured to receive a plurality of deposition materials in at least one of a selective manner or a simultaneous manner, wherein when the at least one inlet receives the plurality of deposition materials in the selective manner the at least one first deposition-head is operable to perform layer deposition of a single layer or stacked layers of individual deposition material of the plurality of deposition materials, and wherein when the at least one inlet receives the plurality of deposition materials in the simultaneous manner the at least one first deposition-head is operable to perform layer deposition of a single layer or stacked layers of mixed deposition material of the plurality of deposition materials.

In a second aspect, an embodiment of the present disclosure provides a multi-material deposition method for deposition extrusion, the method comprising:

providing at least one first deposition-head having at least one inlet;

receiving a plurality of deposition materials by the at least one inlet in a selective manner or a simultaneous manner; and depositing the plurality of deposition materials in the selective manner or the simultaneous manner by the at least one first deposition-head;

wherein when the at least one inlet receives the plurality of deposition materials in the selective manner the at least one first deposition-head is operable to perform layer deposition of a single layer or stacked layers of individual deposition material of the plurality of deposition materials, and wherein when the at least one inlet receives the plurality of deposition materials in the simultaneous manner the at least one first deposition-head is operable to perform layer deposition of a single layer or stacked layers of mixed deposition material of the plurality of deposition materials.

Embodiments of the present disclosure substantially eliminate or at least partially address the aforementioned problems in the prior art and enable the multi-material deposition extrusion in a fast and efficient manner. Moreover, the multi-material deposition arrangement is cost-efficient, saves power as well as the plurality of deposition material, when in operation. Furthermore, the multi-material deposition arrangement supports both the layer deposition and the point deposition simultaneously based on an application thereof.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein.

Figure 1:
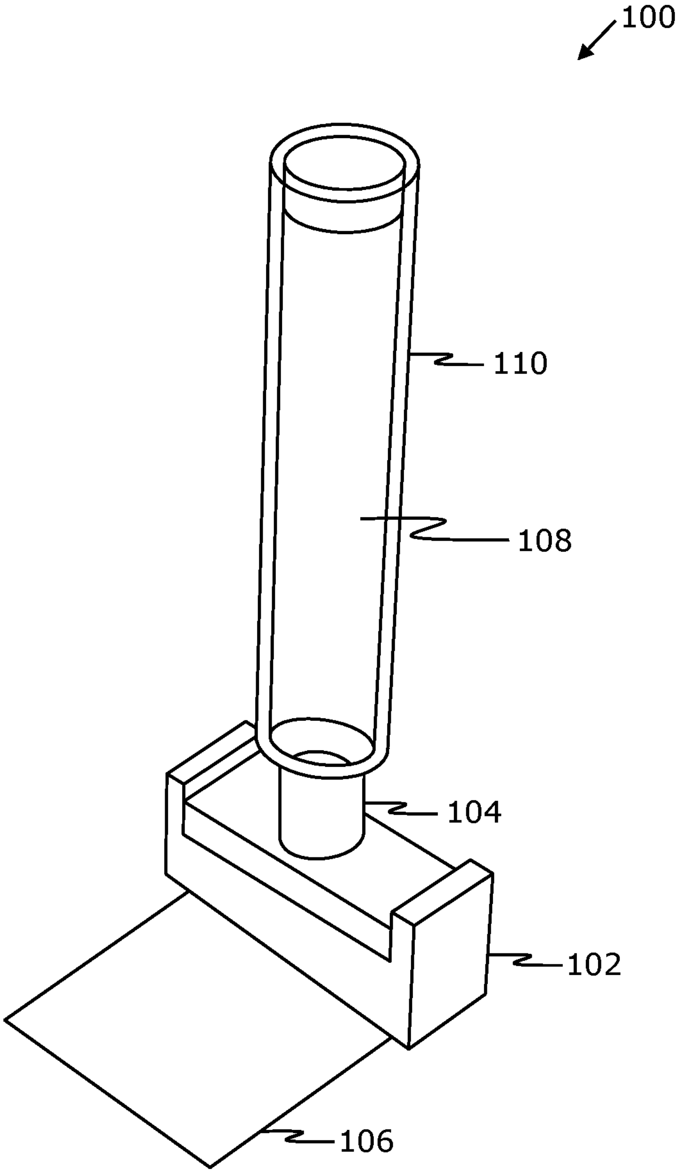
FIG. 1 is a schematic illustration of a multi-material deposition arrangement for deposition extrusion, in accordance with different embodiments of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, an embodiment of the present disclosure provides a multi-material deposition arrangement for deposition extrusion, the multi-material deposition arrangement comprising:

at least one first deposition-head having at least one inlet;

wherein the at least one inlet is configured to receive a plurality of deposition materials in at least one of a selective manner or a simultaneous manner, wherein when the at least one inlet receives the plurality of deposition materials in the selective manner the at least one first deposition-head is operable to perform layer deposition of a single layer or stacked layers of individual deposition material of the plurality of deposition materials, and wherein when the at least one inlet receives the plurality of deposition materials in the simultaneous manner the at least one first deposition-head is operable to perform layer deposition of a single layer or stacked layers of mixed deposition material of the plurality of deposition materials.

In a second aspect, an embodiment of the present disclosure provides a multi-material deposition method for deposition extrusion, the method comprising:

providing at least one first deposition-head having at least one inlet;

receiving a plurality of deposition materials by the at least one inlet in a selective manner or a simultaneous manner; and depositing the plurality of deposition materials in the selective manner or the simultaneous manner by the at least one first deposition-head;

wherein when the at least one inlet receives the plurality of deposition materials in the selective manner the at least one first deposition-head is operable to perform layer deposition of a single layer or stacked layers of individual deposition material of the plurality of deposition materials, and wherein when the at least one inlet receives the plurality of deposition materials in the simultaneous manner the at least one first deposition-head is operable to perform layer deposition of a single layer or stacked layers of mixed deposition material of the plurality of deposition materials.

The present disclosure provides the aforementioned multi-material deposition arrangement for deposition extrusion and the aforementioned multi-material deposition method for deposition extrusion. It will be appreciated that the at least one first deposition-head is used for deposition extrusion of the plurality of deposition materials having a wide range of viscosities and at high web speeds. Advantageously, the at least one first deposition-head supports manufacturing of advanced thin-films and at low-cost, thereby providing high-volume products. Furthermore, the at least one first deposition-head includes one or more inlets for selective or simultaneous deposition extrusion of the plurality of deposition materials based on an application thereof. Additionally, the multi-material deposition arrangement ensures high coating uniformity of the single layers and the stacked layers. Beneficially, the multi-material deposition arrangement allows faster deposition extrusion of the layered multi-material, thereby saving power and the plurality of deposition material.

The term "deposition" as used herein refers to an act of laying or depositing a material on a substrate. The term "extrusion" as used herein refers to a manufacturing process where plastic resins, polymers, metals, gels are melted and/or pushed through a slit die into films or sheets or desired geometry, cooled down, and then wound up to the final roll products or drawn and cooled down to become final product. Moreover, the material adopts the cross-sectional profile of the die. Optionally, the deposition of the material may refer to a printing of the material in 3D printing, bio printing or pharma printing. Optionally, the extrusion of the material may refer to a casting of the material. Optionally the extrusion of the material may be applied to a handheld bio, pharma or material fabrication. It will be appreciated that the multi-material deposition arrangement supports both deposition and extrusion of the multiple materials to produce complex cross-sections, geometries or designs having excellent surface finish.

The term "plurality of deposition materials" as used herein refers to two or more material that are used for manufacturing of an object. The object may include, but is not limited to, one-dimensional (1D), two-dimensional (2D), or three-dimensional (3D), product that is produced as a result of the deposition extrusion. Moreover, the plurality of deposition materials may be in a powdered form, in a liquid form, in a form of a continuous filament, and so forth. Optionally, the plurality of deposition materials has predefined set of parameters. The set of parameters include, but do not limit to, a mass, a weight, a volume, a density and flow characteristics. The plurality of deposition materials may be a metal (such as titanium, steel, aluminium, copper, an alloy, superalloys, and so forth), a biological tissue, a composite base, continuous fiber filaments, ceramic, cement, and so forth. Optionally, the plurality of deposition materials may be required to undergo some physical changes before deposition extrusion thereof from at least one first deposition-head. In an example, the plurality of deposition materials may be melted before deposition extrusion thereof.

The term "at least one first deposition-head" as used herein refers to one or more component of the multi-material deposition arrangement used for deposition extrusion of the plurality of deposition materials. In this regard, the at least one first deposition-head enables the deposition extrusion of the plurality of deposition materials to produce the object. For example, the at least one first deposition-head supports the deposition extrusion of two deposition materials such as Fibrin and Collagen. Moreover, the at least one first deposition-head comprises at least one inlet. Herein, the at least one inlet refers to one or more means of an entry associated with the at least one first deposition-head. In an example, the at least one first deposition-head includes one inlet. In another example, the at least one first deposition-head includes two or more inlet.

The at least one inlet is configured to receive the plurality of deposition materials in at least one of a selective manner or a simultaneous manner. Herein, the selective manner refers to receiving an individual deposition material from the plurality of deposition materials at a time. In this regard, the at least one first deposition-head, via the at least one inlet, receives the individual deposition material for deposition extrusion thereof. Herein, the simultaneous manner refers to receiving the plurality of deposition materials altogether at a same time in the at least one first deposition-head. In this regard, the at least one first deposition-head, via the at least one inlet, receives the plurality of deposition materials for deposition extrusion thereof.

It will be appreciated that when the at least one inlet receives the plurality of deposition materials in the selective manner the at least one first deposition-head is operable to perform layer deposition of a single layer or stacked layers of individual deposition material of the plurality of deposition materials. In this regard, the at least one first deposition-head, via the at least one inlet, receives the individual deposition materials from the plurality of deposition materials and deposit the single layer of the corresponding individual deposition materials. Moreover, the at least one first deposition-head is configured to deposit consecutive single layer of the corresponding individual deposition materials to form the stack thereof. In an example, the multi-material deposition arrangement performs the deposition extrusion of two individual deposition materials such as graphene and organic polymer, then the at least one first deposition-head is operable to deposit a first single layer of the graphene and then deposit a consecutive second single layer of the graphene thereon. In another example, the at least one first deposition-head will first deposit a first single layer of the organic polymer and then deposit a second single layer of the graphene thereon to form the stacked layers.

It will be appreciated that when the at least one inlet receives the plurality of deposition materials in the simultaneous manner the at least one first deposition-head is operable to perform layer deposition of a single layer or stacked layers of mixed deposition material of the plurality of deposition materials. In this regard, the at least one inlet is configured to receive two or more individual deposition materials at the same time, thereby enabling the at least one first deposition-head to perform deposition extrusion of the mixed deposition material. In an example, the at least one first deposition-head receives a binder and active pharmaceutical ingredients (APIs) simultaneously via the at least one inlet. Then, the at least one first deposition-head performs the deposition extrusion of the binder and the APIs to produce either the single layer or the stacked layers of the mixed deposition material. In the aforementioned example, the mixed deposition material is a medicine that can be designed with different shapes, sizes or APIs-percentages based on an application thereof.

Optionally, the at least one first deposition-head is a slot die head comprising:

- a pair of head-halves sealingly coupled to each other,
- a manifold configured on at least one of the pair of head-halves and fluidically coupled to the at least one inlet,
- a shim arranged between the pair of head-halves for spacing apart the pair of head-halves, and
- a meniscus guide arranged adjacent to the shim and between the pair of head-halves.

The term "slot die head" as used herein refers to a mechanical arrangement that is used for providing a uniform delivery of solution to a given surface. In this regard, the slot die head is used to control the distribution of the plurality of deposition materials across a width of a layer thereof, the actual coating width of a film, and determine the stability of the deposition extrusion. Herein, the pair of head halves refer to two faces of the slot die head that forms an outer covering or housing of the slot die head when sealingly coupled to each other. The term "manifold" as used herein refers to a machine element that is used to regulate a fluid flow. In this regard, the manifold is configured on at least one of the pair of head-halves. Moreover, the manifold is fluidically coupled to the at least one inlet in order to allow the plurality of deposition material pass therethrough. Optionally, the slot die head may include multiple manifolds to improve the distribution of the plurality of deposition materials. Optionally, the manifold may possess various designs and different cross sections, based on an application thereof. For example, the manifold may possess a T-shaped design, where the bottom and top edges of the manifold run parallel to the exit of the slot die head. This creates a constant length for the individual deposition material to travel to the exit slot and results in a drop in pressure away from the at least one inlet. This leads to lower solution flow rates closer to the ends of the manifold, uneven solution distribution over the width of the head, and different travel times for solutions. In another example, the manifold may possess a coat-hanger design to achieve equal flow rates across the width of the slot die head. This is where the bottom edge of the manifold becomes closer to the exit of the slot-die head as the distance from the at least one inlet increases. Although the flow rate of the solution becomes more uniform across the width when utilising a coat-hanger design, the shape of the coat-hanger must be re-optimised for different flow rates and solution viscosities.

The term "shim" as used herein refers to a thin, often tapered piece of material (such as metal) used between two parts of an object to make them fit together, or to prevent them rubbing against each other. Typically, the shim is used for support, levelling, or adjustment of the fit. In this regard, the pair of head-halves are spaced apart by arranging the shim between thereof. Optionally, a size or dimensions of the shim is manipulated based on a flow rate and/or viscosity of the plurality of deposition material. It will be appreciated that the size of the shim is used for maintaining a pressure drop at a fixed value. In addition, the shim can also be used to set a width of the single layer of the plurality of deposition material. Advantageously, the shim is used to define the width of the single layer. Optionally, the shim may be used for the deposition of stripe patterns. The term "meniscus guide" as used herein refers to a sheet of metal having thin protrusions in the bottom side thereof. In this regard, the meniscus guide is arranged adjacent to the shim and between the pair of head-halves. It will be appreciated that the meniscus guide is used to improve the edge quality of the at least one second deposition-head. Optionally, the protrusions are placed where the stripe pattern is needed, and act to pin the meniscus guide to the shims.

Optionally, the at least one first deposition-head is a slot die head comprising:

- a pair of head-halves sealingly coupled to each other,
- a manifold configured on at least one of the pair of head-halves and fluidically coupled to the at least one inlet,
- a plurality of shims arranged between the pair of head-halves for spacing apart the pair of head-halves, and
- a plurality of meniscus guides arranged adjacent to the plurality of shims forming multiple pairs of shim and adjacent meniscus guid, wherein each of the multiple pairs of shim and meniscus guide is fluidically coupled to an inlet of the at least one inlet.

In this regard, the at least one first deposition-head comprises two or more shims and meniscus guide based on an application thereof. In an example, at least one first deposition-head may include two shims arranged in between the pair of head-halves. In this regard, the second shim is adjusted to extrude a few seconds later than the first shim. Herein, the time interval may be between 0.1 s and 0.999 s. Moreover, when the shim having a length 'Li' and the meniscus guide having a height 'Di' is used then the at least one first deposition-head performs the deposition extrusion of the single layer having the length 'L' and the height 'D'. Optionally, the length 'L' and the height 'D' can be in a range from 1 μm to 30 cm. Optionally, the at least one first deposition-head can be adjusted manually or automatically based on the height of the single layer. Moreover, the number of shims and the meniscus guide to be used is based on the number of deposition materials required during the operation. It will be appreciated that the plurality of shims and the meniscus guide supports faster operation and energy saving.

Optionally, at least one of the shim and the meniscus guide is made of a flexible material including but not limited to silicon or rubber. Herein, the flexible material refers to the materials that possess the ability to bend or compress easily without cracking under normal conditions. It will be appreciated that the flexible material is the silicon or the rubber. Advantageously, the flexible material enables the multi-material deposition arrangement to perform the multi-material deposition extrusion on a non-planar surface. Herein, the non-planar surface refers to a surface having more than one single plane. Optionally, the non-planar surface has different levels of flatness, shape and angles, resulting in either a flat, curved or uneven printing surface. Therefore, the flexible shim and the meniscus guide allows the at least one first deposition-head to perform the deposition extrusion along the x, y and z geometrical coordinates of a geometrical plane or in the non-planar surfaces. It will be appreciated that flexibility of the at least one shim and the meniscus guide provides a faster production time. Furthermore, the at least one flexible shim and the meniscus guide saves energy. Beneficially, the at least one flexible shim and the meniscus guide prevents the plurality of deposition materials from a leakage thereof. Additionally, the at least one flexible shim and the meniscus guide enables user to have the plurality of deposition material casted at once.

Optionally, when two or more inlets of the at least one inlet receive two or more deposition materials in the simultaneous manner the least one first deposition-head is operable to perform layer deposition of two or more deposition materials simultaneously to form the stacked layers thereof. In this regard, the at least one first deposition-head includes two or more inlets to receive the individual deposition materials in each one of them at the same time. Moreover, the at least one first deposition-head is configured to perform layer deposition of each of the individual deposition material to form the stacked layers thereof. In an example, the at least one first deposition-head receives a first deposition material via a first inlet and a second deposition material via a second inlet. Then the at least one first deposition-head perform layer deposition of the first deposition material and the second deposition material simultaneously and forming stacked layers thereof.

Optionally, the two or more inlets are configured to receive two or more deposition materials at a gap of pre-determined interval of time, distance or volume causing the at least one first deposition-head to perform layer deposition of the two or more deposition materials at the gap of pre-determined interval of time. In this regard, the pre-determined interval of time allows a first layer having the two or more deposition materials to dry or solidify before the application of a second layer of the two or more deposition materials thereon. Herein, the distance is selected on the basis of dimensions of the shim and the meniscus guide. Optionally, the distance is selected on the basis of the distance between two individual single layers. Optionally, the distance is selected on the basis of the distance between the single layer and the at least one first deposition-head. Optionally, the distance between the single layer and the at least one first deposition-head may be in a range from 0.1 micrometres (μm) to 10 centimetres (cm). Furthermore, the volume of the deposition material that is to be received from each of the inlet is pre-determined. In an example, a first inlet selected from the two or more inlets is operable to receive a first deposition material having a pre-determined volume (such as 0.5 millilitres) and perform a layer deposition thereof. Then, a second inlet selected from the two or more inlets is used to receive a second deposition material after a complete pre-determined volume (such as 0.5 millilitres) of the first deposition material is deposited. Thus, in above example, the second deposition material is deposited at the gap of 0.5 ml volume of the first deposition material. having the pre-determined volume (such as 0.25 millilitres) and perform the layer deposition thereof. Optionally, the volume may range from 1 Pico litres to 999 millilitres (ml).

Optionally, a potential difference is applied between the at least one first deposition-head and a substrate, on which the at least one first deposition-head deposits the plurality of deposition materials, for employing an electro-melting or a spraying deposition technique. Herein, the potential difference refers to a difference in electric potential between two points. In this regard, the potential difference is a work needed per unit of charge to move a test charge between the two points such as the at least one first deposition-head and the substrate. Herein, the substrate refers to a printable surface. Optionally, the substrate may be a conventional printing bed, a metal or a metallic coating, and so forth. Optionally, the substrate is a non-woven fibre that is used for treating a wound. In operation, the substrate is a metallic printing bed having a ground or a positive voltage (charge). It will be appreciated that the ground or the positive voltage (charge) supports the accurate and efficient deposition of the plurality of deposition materials on the metallic printing bed.

The term "electro-melting" as used herein refers to a technique that is used to fuse metal particles and create, layer by layer, the desired product. It will be appreciated that the electro-melting process enables the creation of complex and highly resistant structures on the substrate. Moreover, the slot die head may have minimum one part where the potential difference is applied. The potential difference may be used for making layered fibres through electro melting technique by connecting one end in the part of the slot die head and another to the substrate. Optionally, the plurality of deposition materials may be atomised into an aerosol directed over the substrate. The term "spraying deposition technique" as used herein refers to a technique that is used to rapidly prototype thin uniform layers. Optionally, the spraying deposition technique may include ultrasonic spraying, venturi based spraying and so forth. Optionally, the venturi based spraying may be used when a drop size of the plurality of deposition material being a crucial parameter. Optionally, the venturi based spraying prevent unwanted spray drift of the smallest droplets of the plurality of deposition material. Optionally, the spraying deposition technique is used to building interactive objects. Advantageously, the spraying deposition technique possess ability to provide consistent thicknesses and uniform layers to the non-planar surfaces.

Optionally, the multi-material deposition arrangement further comprises at least one second deposition-head operable to perform point deposition, wherein the at least one second deposition-head is coupled to the at least one first deposition-head to form a combined deposition-head-unit or the at least one second deposition-head is spaced apart from the at least one first deposition-head to form modular units of the at least one first and second deposition-heads. The term "second deposition-head" as used herein refers to a printing head that is configured to dispense the plurality of deposition printing material that is being used for the manufacturing of the printed object. The at least one second deposition-head may for example be implemented to have a syringe-like structure. The at least one second deposition-head enables extrusion of the printing material in a controlled manner, such that the printing head continuously extrudes minute amount of the deposition printing material therefrom. Optionally, the printing head comprises a container for containing the printing material and a nozzle for extruding the deposition printing material therefrom. Moreover, the nozzle may have a wide range of cross-section, such as diameter, and shape. It will be appreciated that the diameter of the nozzle has a great effect on an extrusion pressure required for a continuous deposition printing material flow (namely, extrusion). Beneficially, the multi-material deposition arrangement eliminates the need of changing the at least one second deposition-head and the at least one first deposition-head during the operation, thereby saving the energy.

The term "point deposition" as used herein refers to a drop wise deposition extrusion of a material to produce fine thin lines thereof. In this regard, the at least one second deposition-head and the at least one first deposition-head is coupled together to form the combined deposition-head-unit. It will be appreciated that the combined deposition-head-unit supports both the layer deposition and the point deposition based on an application thereof. Moreover, the modular units support selection of the individual deposition material in the at least one first deposition-head and the at least one second deposition-head based on an application thereof. In an example, the multi-material deposition arrangement includes one or more first deposition-head and the second deposition-head arranged in series to perform deposition extrusion of the plurality of deposition material.

Optionally, the at least one second deposition-head is the printing head employing one of an inkjet technique, a direct light processor technique or a laser technique. Herein, the inkjet technique enables the deposition extrusion of the plurality of deposition material via a metal nozzle in a form of jet drops. Herein, the direct light processor technique refers to a 3D printing technology that is used to rapidly produce photopolymer parts. Optionally, the direct light processor technique enables a projected light source to cure the entire layer of the plurality of deposition material at once. Advantageously, the direct light processor technique may be used to print extremely intricate resin design items such as toys, jewellery moulds, dental moulds, and so forth with fine details. Optionally, the laser technique employs a process called powder bed fusion to create 3D objects. Optionally, the laser technique may often use nylon as the deposition material. Optionally, the deposition material is transferred from bins containing fresh powder into a processing chamber using a recoating tool. Afterwards, a laser is used to scan the powder layers, sintering together with the particles thus making a first 3D layer of an object.

In an implementation form, the modular units of the at least one first and second deposition-heads is used for various life science and clinical applications. For example, the multi-material deposition arrangement is used for printing various formulations such as layer by layer programmable Oro dispersible films, layered medicine or drugs in a factory. Optionally, the multi-material deposition arrangement may be used in a hospital for injecting direct to patient different type of medicine/drugs for different skin layers outside the human body, or inside the mouth or onto the eye. Optionally, the multi-material deposition arrangement may be used for making own substrate of any geometry as per the needs of experimentation or clinical need and also for tissue biopsy or organoid generation where a plurality of living cells are seeded in between the layers of the plurality of deposition materials. Optionally, the multi-material deposition arrangement may be used for pharmaceutical application, drug toxicity assays and chemotaxis or immunotoxins assays for basic life science application, drug development and diagnosis applications.

Optionally, the at least one second deposition-head receives a plurality of deposition materials in at least one of a selective manner or a simultaneous manner, wherein when the at least one second deposition-head receives the plurality of deposition materials in the selective manner the at least one second deposition-head is operable to perform the point deposition of a single line or stacked lines of individual deposition material of the plurality of deposition materials, and wherein when the at least one second deposition-head receives the plurality of deposition materials in the simultaneous manner the at least one second deposition-head is operable to perform the point deposition of a single line or stacked lines of mixed deposition material of the plurality of deposition materials.

In this regard, the at least one second deposition-head, via the at least one inlet, receives the individual deposition materials from the plurality of deposition materials and deposit the single line of the corresponding individual deposition materials. Moreover, the at least one second deposition-head is configured to deposit consecutive single lines of the corresponding individual deposition materials to form a stack thereof. In an example, the multi-material deposition arrangement performs the deposition extrusion of two individual deposition materials such as polymer and rubber, then the at least one second deposition-head is operable to first deposit a first single line of the polymer and then deposit a consecutive second single line of the polymer thereon. In another example, the at least one deposition-head is operable to deposit a first single line of the polymer and then deposit a second single line of the polymer thereon to form the stacked lines.

Additionally, the at least one second deposition-head is configured to receive two or more individual deposition materials at the same time, to perform deposition extrusion of the mixed deposition material. In an example, the at least one second deposition-head is operable to receive two different conductive hydrogels simultaneously via the at least one inlet. Then, the at least one second deposition-head performs the deposition extrusion of the two different conductive hydrogels to produce either the single line or the stacked lines of the mixed deposition material. The deposition extrusion of the mixed deposition material is used to produce flexible electronics such as photo voltaic cells.

Optionally, the at least one first deposition-head and the at least one second deposition-head are operable to perform the layer deposition and the point deposition, respectively, in a selective manner or a simultaneous manner. In this regard, the at least one first deposition-head is configured to form the single layer using the layer deposition and then the at least one second deposition-head is operable to perform the point deposition on the previous formed single layer. Moreover, the at least one first deposition-head and the at least one second deposition-head are operable to perform the layer deposition and the point deposition in the simultaneous manner based on an application thereof. In an example, the at least one first deposition-head and the at least one second deposition-head can be used selectively for curing a damaged skin of the human. Herein, the at least one first deposition-head can be used to deposit a skin layer and the at least one second deposition-head can be used to perform the point deposition of medicine on the skin layer.

Optionally, the multi-material deposition arrangement further comprises a cutting unit operable to perform a subtractive technique on deposition performed by the at least one first and second deposition-heads. The term "cutting unit" as used herein refers to a machine that cuts all kinds of shapes and creations from various materials. The term "subtractive technique" as used herein refers to a process in which a part of an object is removed therefrom to make it into a different geometry. Optionally, the subtractive technique may include cutting and/or drilling of the object. In this regard, the at least one first and second deposition-heads performs the deposition extrusion to form the single layer. Then the cutting unit is used to perform the subtractive technique on the deposited single layer to produce a desired product. In an example, the single layer is firstly deposited using the at least one first deposition-head, then the at least one second deposition-head may be used to perform the point deposition on the previously deposited single layer. Then, the cutting unit may be used to perform the subtractive technique on the aforementioned single layer. It will be appreciated that the at least one first deposition-head, the at least one second deposition-head and the cutting unit is used in any combination, or any order based on the application thereof. Beneficially, the aforementioned manipulations allow the single layer or the stacked layers of the plurality of deposition materials to have different geometries in each layer or to remove excess material therefrom. Additionally, the cutting unit provides a smooth finish to the single layer or the stacked layers of the plurality of deposition materials.

Optionally, the multi-material deposition arrangement further comprises a motor-drive unit operatively coupled to the at least one first and second deposition-heads, wherein the motor-drive unit is operable to individually or collectively move the at least one first and second deposition-heads, and wherein the motor-drive unit is operable to move the at least one first and second deposition-heads linearly or rotationally. In this regard, the term "motor-drive unit" as used herein refers to an electrical device that is used for moving and controlling a moving mechanism. In this regard, the motor-drive unit works in conjunction with the at least one first and second deposition-heads to change the direction thereof. It will be appreciated that based on the multidimensions, the motor-drive unit could enable movement of the at least one first and second deposition-heads along at multiple axes. In an example, the motor-drive unit could enable movement of the at least one first and second deposition-heads along only one axis. In another example, the motor-drive unit could enable movement of the at least one first and second deposition-heads along three axes, i.e. an x-axis (side to side (left and right) direction relative to a surface), a y-axis (back to forth direction relative to the surface), and a z-axis (up and down direction relative to the surface). Optionally, the x-axis, the y-axis and the z-axis are mutually perpendicular axes according to cartesian coordinate system. The mutually perpendicular axes enable movement of the at least one first and second deposition-heads along three orthogonal directions.

Optionally, the motor-drive unit is operable to individually move the at least one first and second deposition-heads. In this regard, the motor drive unit is operable to individually move each of the at least one first head and second deposition-heads along multiple axis linearly or rotationally. It will be appreciated that the motor drive unit allows the at least one first and second deposition-heads to move along the three axis independent of each other at least in one axis.

Optionally, the motor-drive unit is operable to collectively move the at least one first and second deposition-heads linearly or rotationally.

In such case, the at least one first and second deposition-heads are configured to have at least three degrees of freedom. The at least one first and second deposition-heads are configured to move linearly along at least three axes (i.e. the x-axis, the y-axis and the z-axis). Optionally, the at least one first and second deposition-heads are configured to rotate about each of the three axes, thus resulting in six degrees of freedom for the at least one first and second deposition-heads. Alternatively, the overall movement of at least one first and second deposition-heads during the multi-material deposition extrusion can be a diagonal position besides a 1D, 2D, 3D movement thereof. In this regard, the at least one first and second deposition-heads may move in any other direction, besides the left and right, back and forth, and up and down directions, such as in a diagonal direction. Moving diagonally upward and forward implies moving in a linear combination of up and forward directions.

Optionally, the multi-material deposition arrangement for 3D printing comprises a multi-material fluidic printing system for providing the plurality of deposition materials in at least one of the selective manner or the simultaneous manner to the at least one first and second deposition-heads. The term "3D printing" as used herein refers to a process of creating or manufacturing an object, physically or virtually having three dimensions. In this regard, the multi-material deposition arrangement is implemented as a 3D printing device for 3D printing various objects. Optionally, the multi-material deposition arrangement is implemented as a 3D bio printing device for various life science and clinical applications.

The term "multi-material fluidic printing system" as used herein refers to a fluidic equipment that is capable of providing the plurality of deposition materials to the at least one first and second deposition-heads. Optionally, the multi-material fluidic printing system has a plurality of fluidic channels to receive the plurality of deposition materials from a plurality of cartridges. In use, the multi-material fluidic printing system receives the plurality of deposition materials from the at least one cartridge. Optionally, the multi-material fluidic printing system is used for manipulation of the plurality of deposition materials in at least one of: a micron-scale, nanoscale, pico-scale, a femto-scale. Moreover, various other applications can also be performed using the multi-material fluidic printing system. In one example, the plurality of deposition materials from the multi-material fluidic printing system can be delivered to the at least one first deposition-head to facilitate coating of membranes, coating antibodies on thin strips to be used in lateral flow device (LFD), such as coronavirus disease (COVID) test, pregnancy test, and the like. In another example, the plurality of deposition materials can be delivered for membrane fabrication, immobilization of synthetic and biological molecules for wound regeneration. Optionally, the multi-material fluidic printing system may comprise at least one flow selector that is implemented as at least one of: a switching valve comprising a plurality of ports, a solenoid array. Technical effect of these implementations is that extrusion and infusion of the plurality of deposition materials in at least one of the selective manner or the simultaneous manner can be precisely and selectively controlled, thereby resulting in efficient functioning of the multi-material deposition arrangement.

The present disclosure also relates to the method as described above. Various embodiments and variants disclosed above, with respect to the aforementioned first aspect, apply mutatis mutandis to the method.

Optionally, the method further comprises receiving two or more deposition materials, by two or more inlets of the at least one inlet, in the simultaneous manner to perform layer deposition of the two or more deposition materials simultaneously to form the stacked layers thereof.

Optionally, the two or more deposition materials are received by the two or more inlets at a gap of pre-determined interval of time, distance or volume causing the at least one first deposition-head to perform the layer deposition of the two or more deposition materials at the gap of pre-determined interval of time.

Optionally, the method further comprises applying a potential difference between the at least one first deposition-head and a substrate, on which the at least one first deposition-head deposits the plurality of deposition materials, for employing an electro-melting or a spraying deposition technique.

Optionally, the method further comprises providing at least one second deposition-head operable to perform point deposition, wherein the at least one second deposition-head is coupled to the at least one first deposition-head to form a combined deposition-head-unit or the at least one second deposition-head is spaced apart from the at least one first deposition-head to form modular units of the at least one first and second deposition-heads.

Optionally, the method further comprises receiving a plurality of deposition materials, by the least one second deposition-head, in at least one of a selective manner or a simultaneous manner, wherein when the at least one second deposition-head receives the plurality of deposition materials in the selective manner the at least one second deposition-head is operable to perform the point deposition of a single line or stacked lines of individual deposition material of the plurality of deposition materials, and wherein when the at least one second deposition-head receives the plurality of deposition materials in the simultaneous manner the at least one second deposition-head is operable to perform the point deposition of a single line or stacked lines of mixed deposition material of the plurality of deposition materials.

Optionally, the method further comprises performing a subtractive technique, on deposition performed by the at least one first deposition-head and the at least one second deposition-head, by a cutting unit.

DETAILED DESCRIPTION OF DRAWINGS

Referring to FIG. 1, there is shown a schematic illustration of a multi-material deposition arrangement 100 for deposition extrusion, in accordance with an embodiment of the present disclosure. As shown, the multi-material deposition arrangement 100 comprises at least one first deposition-head 102 having at least one inlet 104. In this regard, the at least one inlet 104 is configured to receive a plurality of deposition materials (not shown) in a selective manner. Moreover, when the at least one inlet 104 receives the plurality of deposition materials in the selective manner the at least one first deposition-head 102 is operable to perform layer deposition of a single layer 106 of individual deposition material 108 of the plurality of deposition materials. Herein, the individual deposition material 108 is stored inside a cartridge 110.

Figure 2:
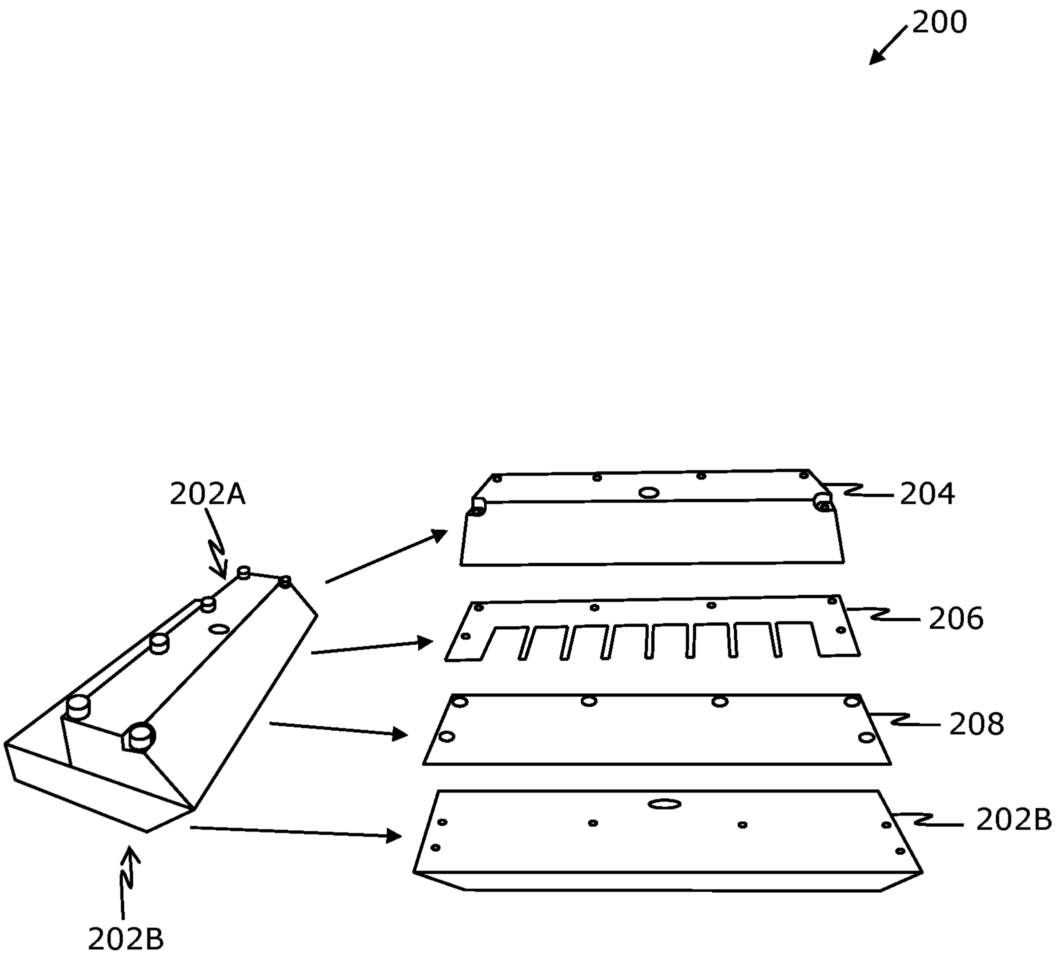
FIG. 2 is a schematic illustration of an exploded view of at least one first deposition-head, in accordance with an embodiment of the present disclosure.

Referring to FIG. 2, there is shown a schematic illustration of an exploded view of at least one first deposition-head 200, in accordance with an embodiment of the present disclosure. As shown, the at least one first deposition-head 200 is a slot die head. The at least one first deposition-head 200 comprises a pair of head-halves 202A and 20213 sealingly coupled to each other. Moreover, the at least one first deposition-head 200 comprises a manifold 204 configured on at least one of the pair of head-halves 202A and 20213 and fluidically coupled to the at least one inlet (not shown). Furthermore, the at least one first deposition-head 200 comprises a shim 206 arranged between the pair of head-halves 202A and 20213 for spacing apart the pair of head-halves 202A and 2026. Furthermore, the at least one first deposition-head 200 comprises a meniscus guide 208 arranged adjacent to the shim 206 and between the pair of head-halves 202A and 2026.

Figure 3A:
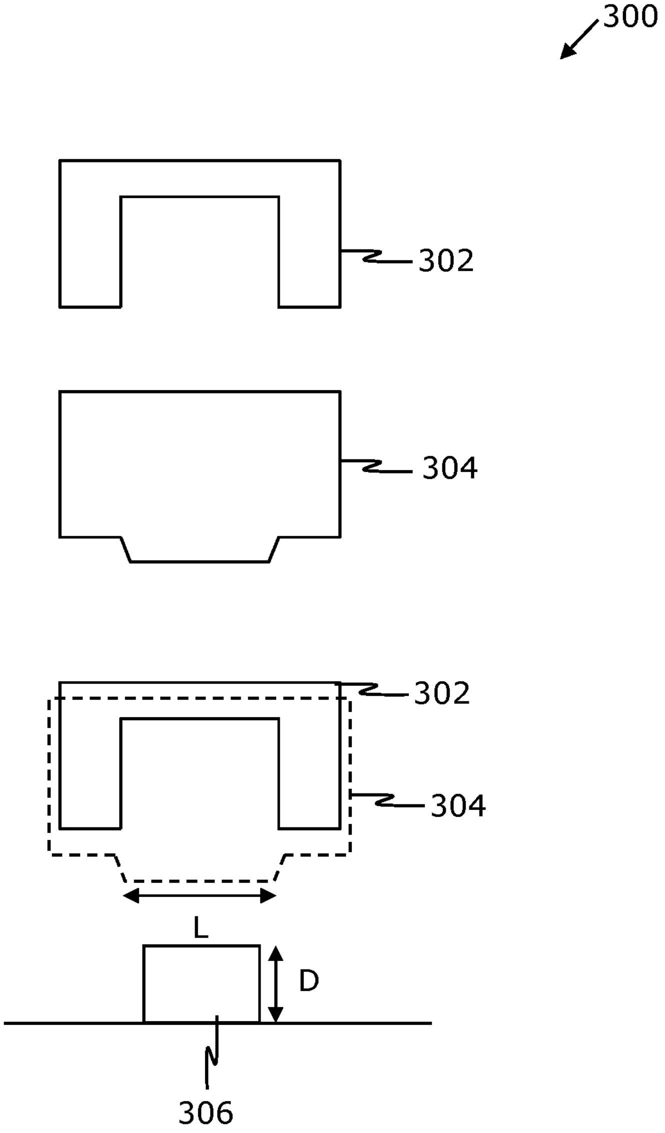
FIGS. 3A and 3B are a schematic illustration of an exemplary implementation of a multi-material deposition arrangement for deposition extrusion, in accordance with another embodiment of the present disclosure.
Figure 3B:
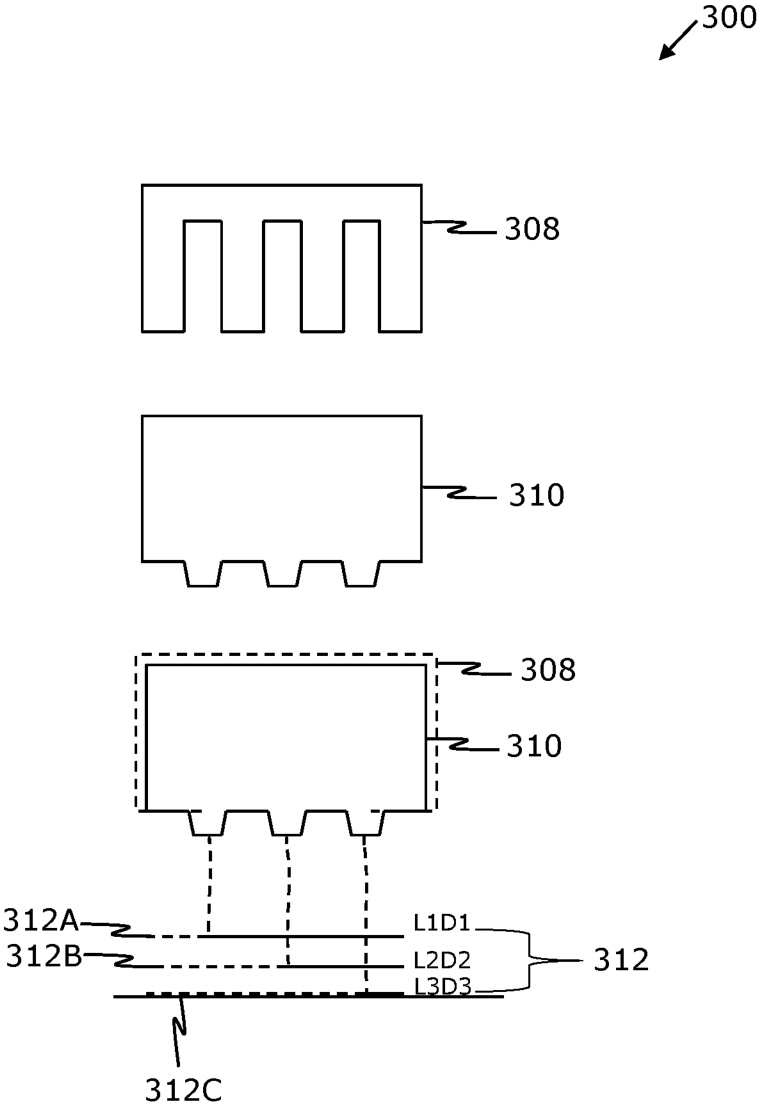

Referring to FIGS. 3A and 3B, illustrated are schematic illustrations of an exemplary implementation of a multi-material deposition arrangement 300 for deposition extrusion, in accordance with an embodiment of the present disclosure. As shown in FIG. 3A, the at least one first deposition-head (not shown) comprises a shim 302 and a meniscus guide 304 arranged between a pair of head-halves (not shown). As shown, the shim 302 and the meniscus guide 304 are performing a layer deposition of the single layer 306. Herein, the single layer 306 is having a length 'L' units and height 'D' units.

As shown in FIG. 3B, there is shown another shim 308 and another meniscus guide 310 arranged between a pair of head-halves (not shown).

As shown, the shim 308 and the meniscus guide 310 are performing a layer deposition of the stacked layer 312. Herein, each of the single layer such as 312A, 3128 and 312C of the stacked layer 312 is having length 'L1', 'L2' and 'L3' units and height 'D1', 'D2', and 'D3' units, respectively. Moreover, herein each of the single layer such as 312A, 3128 and 312C is being deposited at the gap of pre-determined interval of time.

FIGS. 3A and 3B are merely examples, which should not unduly limit the scope of the claims herein. A person skilled in the art will recognize many variations, alternatives, and modifications of embodiments of the present disclosure.

Figure 4:
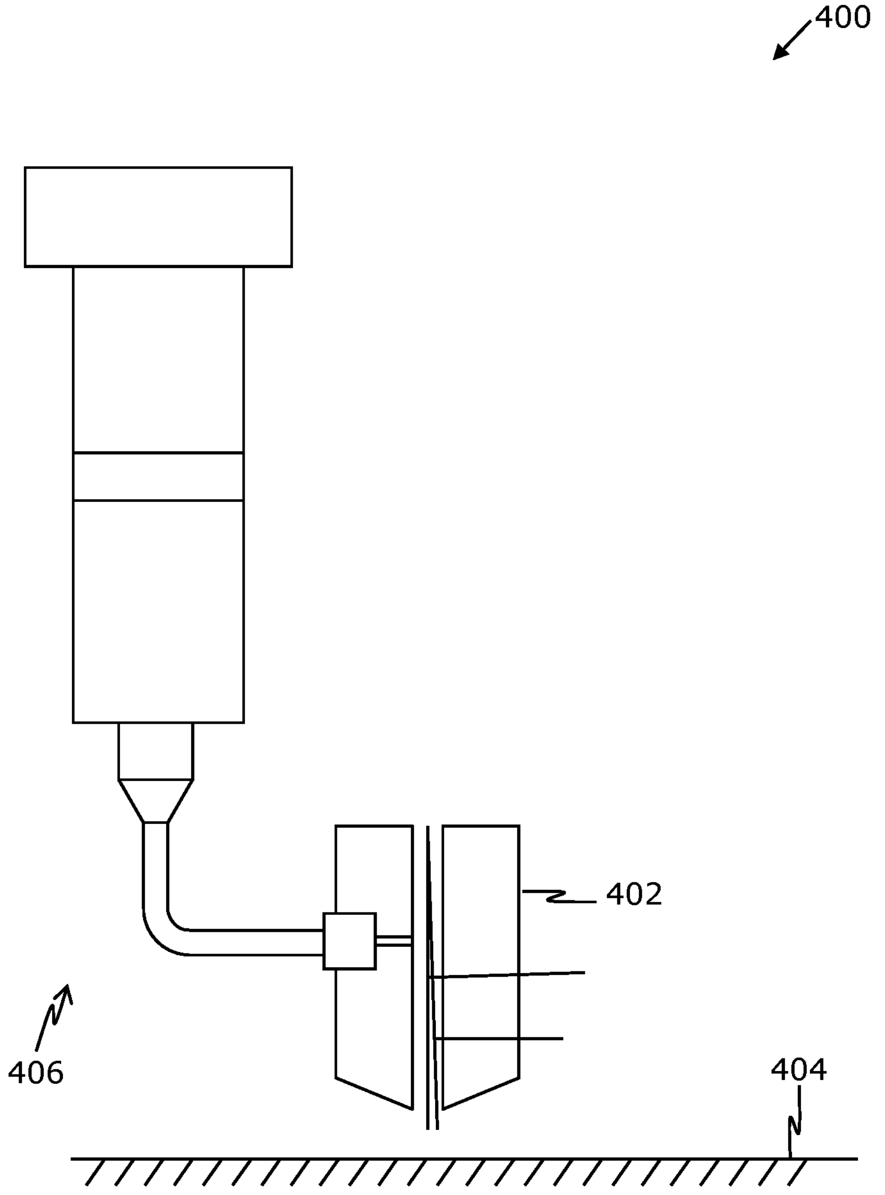
FIG. 4 is a schematic illustration of a multi-material deposition arrangement employing an electro-melting or a spraying deposition technique, in accordance with yet another embodiment of the present disclosure.

Referring to FIG. 4, there is shown a schematic illustration of a multi-material deposition arrangement 400 employing an electro-melting or a spraying deposition technique, in accordance with an embodiment of the present disclosure. As shown, a potential difference is applied between at least one first deposition-head 402 and a substrate 404 of the multi-material deposition arrangement 400. It will be appreciated that the potential difference supports the at least one first deposition-head to employ the electro-melting or the spraying deposition technique in order to deposit the plurality of deposition materials on the substrate 404. Herein, the multi-material deposition arrangement 400 is implemented as a handheld device 406 such as a 3D printer that is being used on various field operations such as in a war, a spaceship, an ambulance, and so forth.

Figure 5:
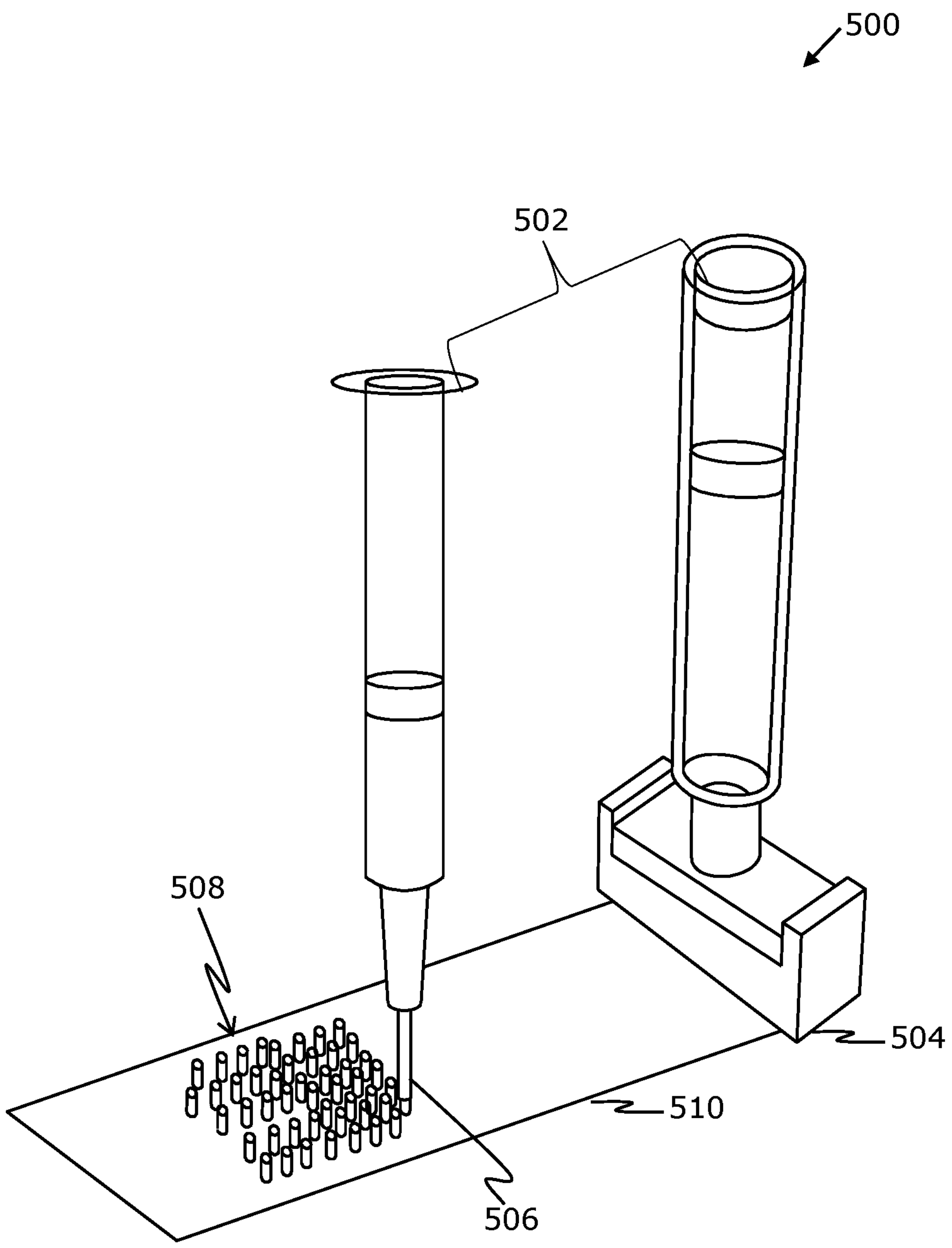
FIG. 5 is a schematic illustration of a multi-material deposition arrangement forming a combined deposition-head-unit, in accordance with an embodiment of the present disclosure.

Referring to FIG. 5, there is shown a schematic illustration of a multi-material deposition arrangement 500 forming a combined deposition-head-unit 502, in accordance with another embodiment of the present disclosure. As shown, the multi-material deposition arrangement 500 comprises at least one first deposition-head 504 and at least one second deposition-head 506. The at least one second deposition-head 506 is coupled to at least one first deposition-head 504 to form the combined deposition-head-unit 502. Herein, the at least one second deposition-head 506 is operable to perform point deposition 508. Moreover, the at least one second deposition-head 506 is spaced apart from the at least one first deposition-head 504 to form modular units of the at least one first 504 and second deposition-heads 506. As shown, the at least one first deposition-head 504 and the at least one second deposition-head 506 are operable to perform a layer deposition 510 and the point deposition 508, respectively, in a selective manner but simultaneously.

Figure 6:
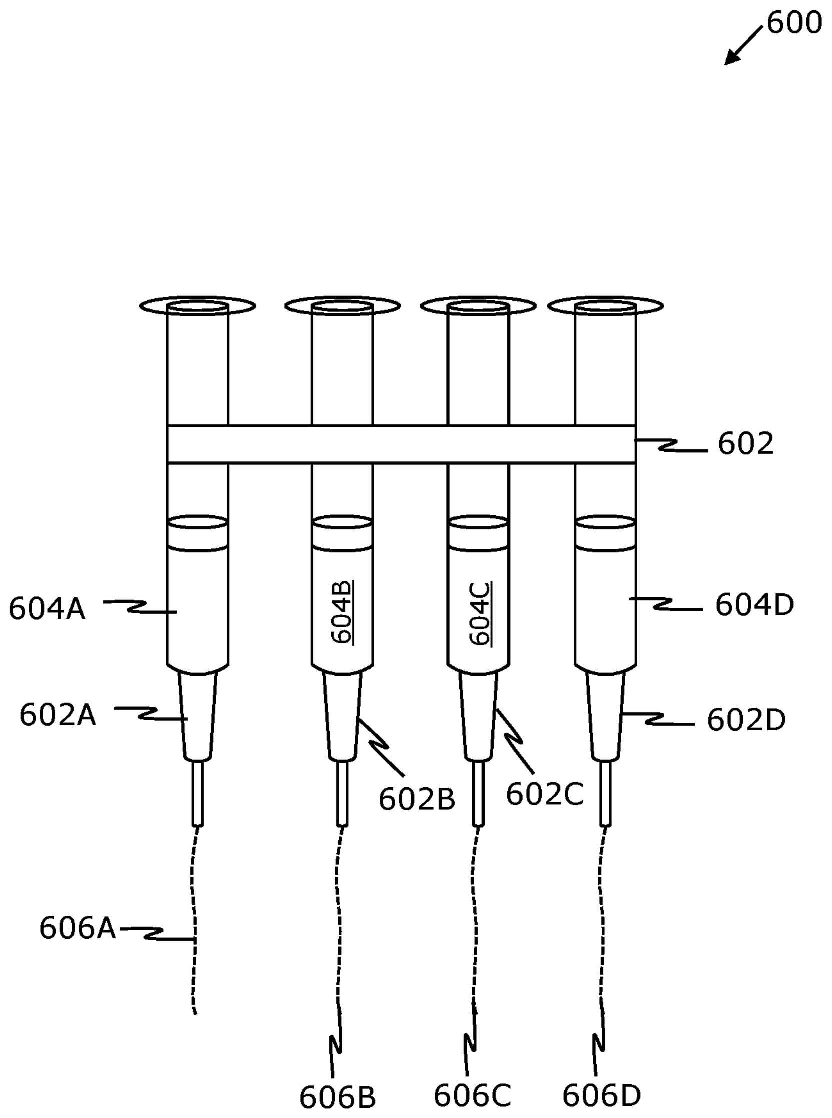
FIG. 6 is a schematic illustration of a multi-material deposition arrangement comprising at least one second deposition-heads, in accordance with another embodiment of the present disclosure.

Referring to FIG. 6, there is shown a schematic illustration of a multi-material deposition arrangement 600 comprising at least one second deposition-heads 602, in accordance with another embodiment of the present disclosure. As shown in FIG. 6, the at least one second deposition-head such as 602A, 60213, 602C, and 602D are receiving the plurality of deposition materials such as 604A, 60413, 604C and 604D, respectively, at a time. Herein, the at least one second deposition-head such as 602A, 60213, 602C, and 602D are performing the point deposition of a plurality of single lines such as 606A, 60613, 606C and 606D of the plurality of deposition materials such as 604A, 60413, 604C and 604D.

Figure 7:
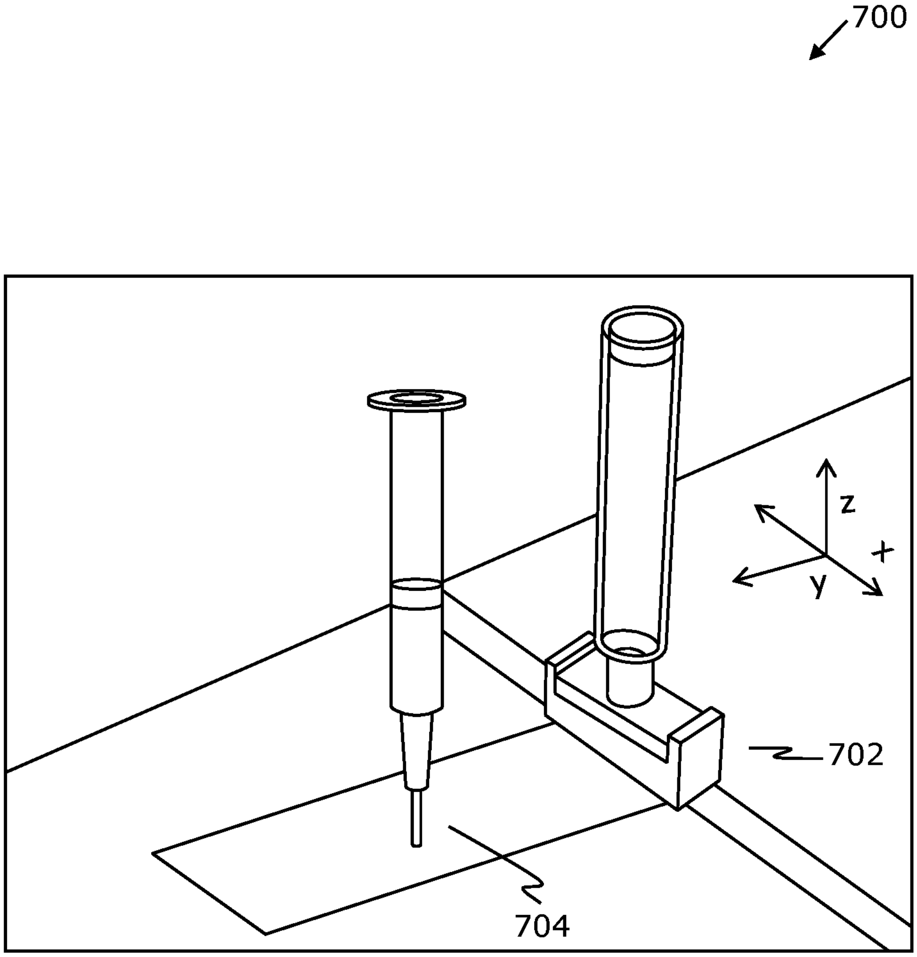
FIG. 7 is a schematic illustration of a multi-material deposition arrangement further comprising a motor-drive unit, in accordance with an embodiment of the present disclosure.

Referring to FIG. 7, there is shown a schematic illustration of a multi-material deposition arrangement 700 further comprising a motor-drive unit (not shown), in accordance with an embodiment of the present disclosure. As shown, the motor-drive unit is operatively coupled to the at least one first 702 and second deposition-heads 704. Moreover, the motor-drive unit is operable to individually or collectively move the at least one first 702 and second deposition-heads 704. Furthermore, the motor-drive unit is operable to move the at least one first 702 and second deposition-heads 704 linearly or rotationally along x-axis, y-axis and/or z-axis coordinates.

Figure 8:
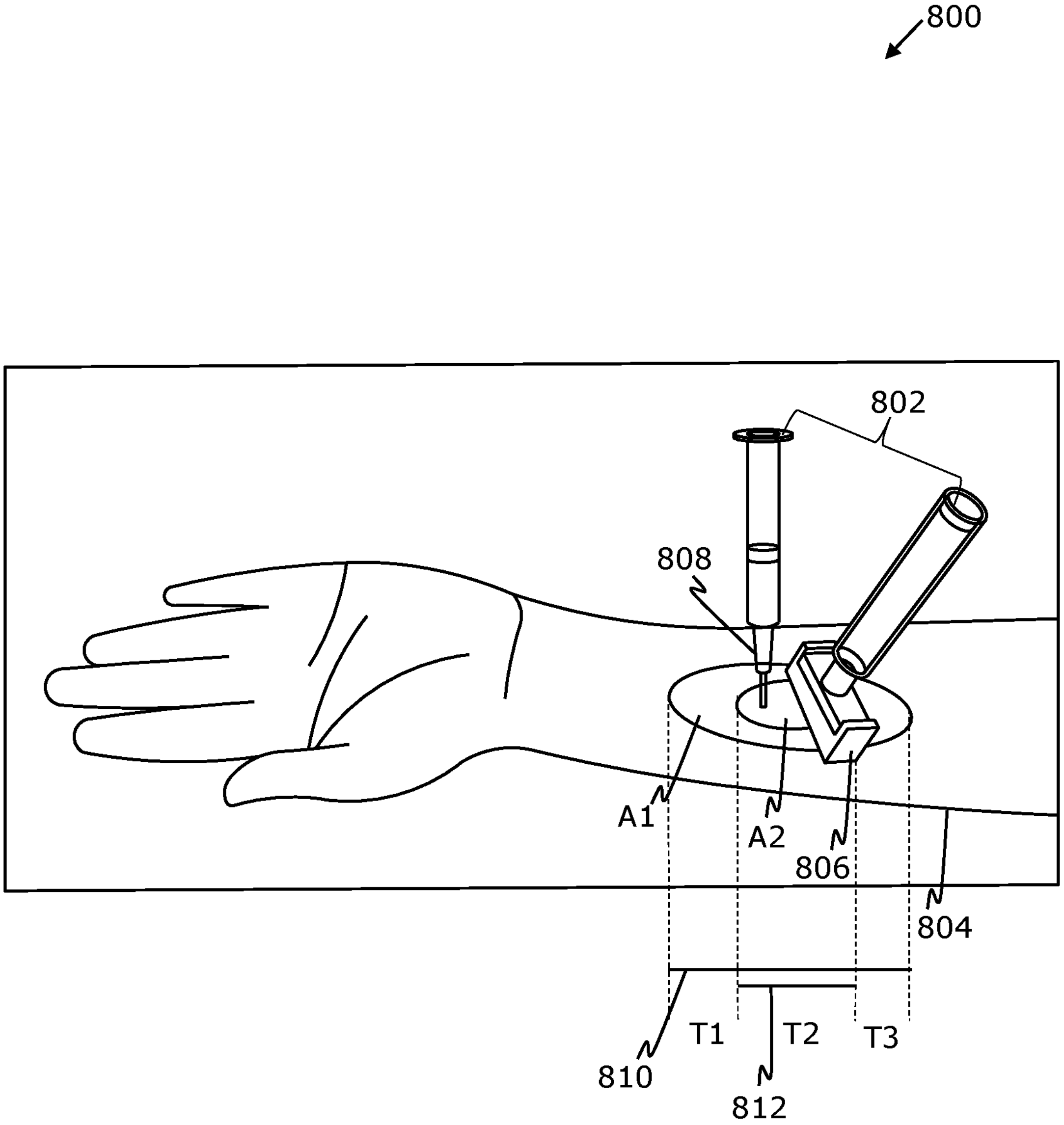
FIG. 8 is a schematic illustration of an environment using a multi-material deposition arrangement for a subject's treatment, in accordance with an embodiment of the present disclosure.

Referring to FIG. 8, there is shown a schematic illustration of an environment 800 using a multi-material deposition arrangement 802 for a subject's 804 treatment, in accordance with an embodiment of the present disclosure. As shown, the multi-material deposition arrangement 802 having at least one first deposition-head 806 and at least one second deposition-head 808 is being used for the subject's 804 treatment. As shown, the subject 804 has burned his/her skin in area A1 wherein a small area A2 has more serious skin damage. Herein, the subject 804 is made ready for predisposal using the multi-material deposition arrangement 802. Now, the at least one first deposition-head 806 is used for performing deposition extrusion of a skin layer 810 on the area A1 from left to right during a time interval T1 until A2 area is reached. Then during a time interval T2 the at least one second deposition-head 808 is used for performing a point deposition of a medicine or a skin tissue on a deeper skin layer 812 within the area A2 simultaneously with the at least one first deposition-head 806 performing deposition extrusion of the skin layer 810 until the end of A2 area is reached, or when the point deposition extrusion is stopped. Moreover, the deposition extrusion of the skin layer 810 is continued till the end of the area A1 during a time interval T3. It will be appreciated that the at least one first deposition-head 806 and the at least one second deposition-head 808 is used for performing the deposition extrusion of the skin layer 810 and the point deposition of the medicine on deeper skin layer 812 in a simultaneous manner during the time interval T2 and in a selective manner during time intervals T1 and T3 when point deposition is not needed.

Figure 9:
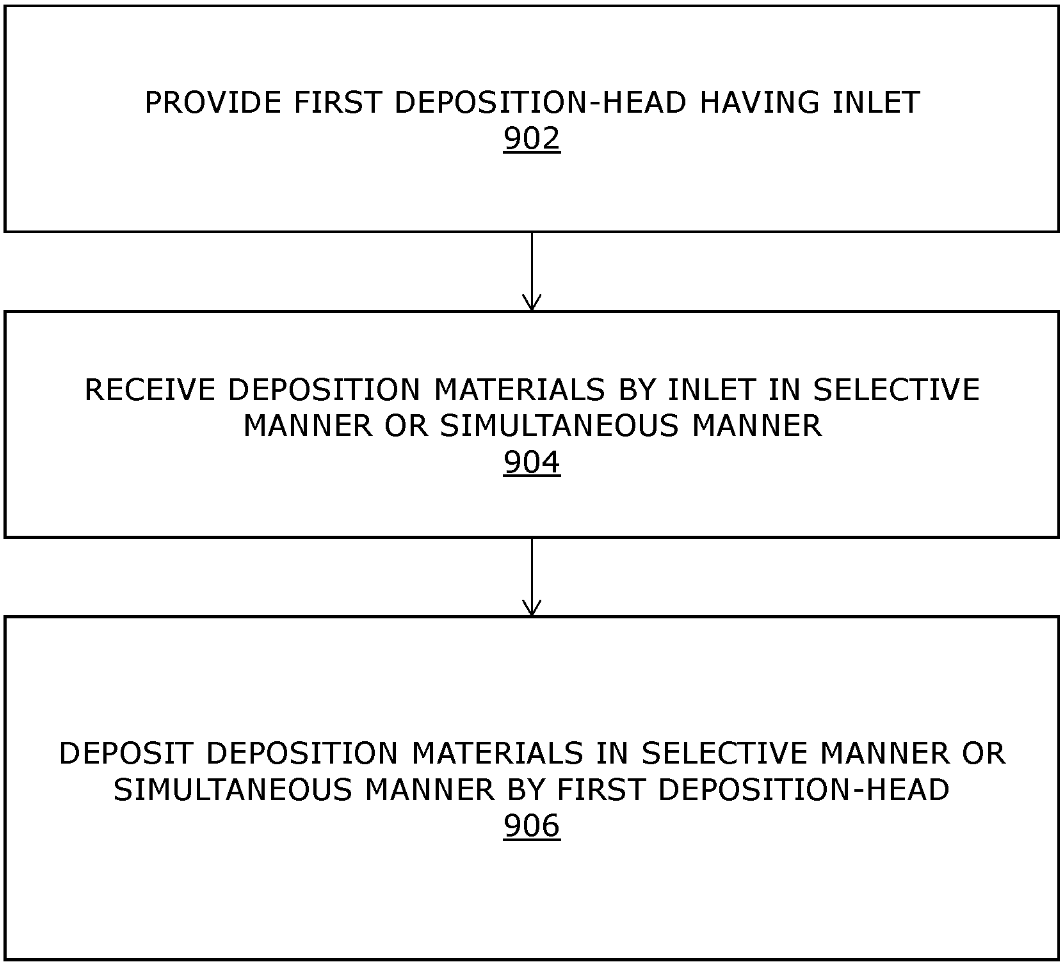
FIG. 9 is a flow chart depicting steps of a multi-material deposition method for deposition extrusion, in accordance with an embodiment of the present disclosure.

Referring to FIG. 9, there is shown a flow chart depicting steps of a multi-material deposition method 900 for deposition extrusion, in accordance with an embodiment of the present disclosure. At step 902, at least one first deposition-head having at least one inlet is provided. At step 904, a plurality of deposition materials is received by the at least one inlet in a selective manner or a simultaneous manner. At step 906, the plurality of deposition materials is deposited in the selective manner or the simultaneous manner by the at least one first deposition-head. It will be appreciated that when the at least one inlet receives the plurality of deposition materials in the selective manner the at least one first deposition-head is operable to perform layer deposition of a single layer or stacked layers of individual deposition material of the plurality of deposition materials. Moreover, when the at least one inlet receives the plurality of deposition materials in the simultaneous manner the at least one first deposition-head is operable to perform layer deposition of a single layer or stacked layers of mixed deposition material of the plurality of deposition materials.

The aforementioned steps are only illustrative, and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A multi-material deposition arrangement for deposition extrusion, the multi-material deposition arrangement comprising:

at least one first deposition-head having at least one inlet;

wherein the at least one inlet is configured to receive a plurality of deposition materials in at least one of a selective manner or a simultaneous manner, wherein when the at least one inlet receives the plurality of deposition materials in the selective manner, the at least one first deposition-head is operable to perform layer deposition of a single layer or stacked layers of individual deposition material of the plurality of deposition materials, wherein when the at least one inlet receives the plurality of deposition materials in the simultaneous manner, the at least one first deposition-head is configured to perform layer deposition of a single layer or stacked layers of mixed deposition material of the plurality of deposition materials, wherein the at least one first deposition-head is operable to perform layer deposition of a first deposition material of the plurality of deposition materials, and to perform layer deposition of a second deposition material of the plurality of deposition materials simultaneous to the layer deposition of the first deposition material, to form the stacked layers thereof, wherein the multi-material deposition arrangement is configured for three-dimensional printing, bio-printing, pharma-printing, pharmaceutical applications, drug toxicity assays, life science applications, drug developments, clinical diagnosis, or a combination thereof, wherein the at least one first deposition-head is a slot die head comprising:

a pair of head-halves sealingly coupled to each other, a manifold configured on at least one of the pair of head-halves and fluidically coupled to the at least one inlet, a shim arranged between the pair of head-halves for spacing apart the pair of head-halves, and a meniscus guide arranged adjacent to the shim and between the pair of head-halves, and wherein at least one of the shim and the meniscus guide is made of a flexible material including but not limited to silicon or rubber.

2. The multi-material deposition arrangement according to claim 1, wherein the at least one first deposition-head is a slot die head further comprising:

a plurality of additional shims arranged between the pair of head-halves for spacing apart the pair of head-halves, and a plurality of additional meniscus guides arranged adjacent to the plurality of shims forming multiple pairs of shim and adjacent meniscus guide, wherein each of the multiple pairs of shim and meniscus guide is fluidically coupled to an inlet of the at least one inlet.

3. The multi-material deposition arrangement according to claim 1, wherein the at least one inlet comprises two or more inlets configured to receive two or more deposition materials at a gap of predetermined interval of time, distance or volume causing the at least one first deposition-head to perform layer deposition of the two or more deposition materials at the gap of pre-determined interval of time.

4. The multi-material deposition arrangement according to claim 1, wherein a potential difference is applied between the at least one first deposition-head and a substrate on which the at least one first deposition-head deposits the plurality of deposition materials, for employing an electro-melting or a spraying deposition technique.

5. The multi-material deposition arrangement according to claim 1, further comprising at least one second deposition-head configured to perform point deposition, wherein the at least one second deposition-head is coupled to the at least one first deposition-head to form a combined deposition-head-unit or the at least one second deposition-head is spaced apart from the at least one first deposition-head to form modular units of the at least one first and second deposition-heads.

6. The multi-material deposition arrangement to claim 5, wherein the at least one second deposition-head receives a plurality of deposition materials in at least one of a selective manner or a simultaneous manner, wherein when the at least one second deposition-head receives the plurality of deposition materials in the selective manner the at least one second deposition-head is operable to perform the point deposition of a single line or stacked lines of individual deposition material of the plurality of deposition materials, and wherein when the at least one second deposition-head receives the plurality of deposition materials in the simultaneous manner the at least one second deposition-head is operable to perform the point deposition of a single line or stacked lines of mixed deposition material of the plurality of deposition materials.

7. The multi-material deposition arrangement to claim 5, wherein the at least one first deposition-head and the at least one second deposition-head are operable to perform the layer deposition and the point deposition, respectively, in a selective manner or a simultaneous manner.

8. The multi-material deposition arrangement according to claim 1, further comprising at least one second deposition-head and a cutting unit operable to perform a subtractive technique on deposition performed by the at least one first and second deposition-heads.

9. The multi-material deposition arrangement according to claim 5, further comprising a motor-drive unit operatively coupled to the at least one first and second deposition-heads, wherein the motor-drive unit is operable to individually or collectively move the at least one first and second deposition-heads, and wherein the motor-drive unit is operable to move the at least one first and second deposition-heads linearly or rotationally.

10. The multi-material deposition arrangement according to claim 1, comprising a multi-material fluidic printing system for providing the plurality of deposition materials in at least one of the selective manner or the simultaneous manner to the at least one first and second deposition-heads.

11. A multi-material deposition method for deposition extrusion, the method comprising:

providing at least one first deposition-head having at least one inlet;

receiving a plurality of deposition materials by the at least one inlet in a selective manner or a simultaneous manner; and depositing the plurality of deposition materials in the selective manner or the simultaneous manner by the at least one first deposition-head;

wherein when the at least one inlet receives the plurality of deposition materials in the selective manner, the least one first deposition-head is operable to perform layer deposition of a single layer or stacked layers of individual deposition material of the plurality of deposition materials, wherein when the at least one inlet receives the plurality of deposition materials in the simultaneous manner, the at least one first deposition-head is operable to perform layer deposition of a single layer or stacked layers of mixed deposition material of the plurality of deposition materials, wherein the at least one first deposition-head is operable to perform layer deposition of a first deposition material of the plurality of deposition materials, and to perform layer deposition of a second deposition material of the plurality of deposition materials simultaneous to the layer deposition of the first deposition material, to form the stacked layers thereof, and wherein the multi-material deposition method is for three-dimensional printing, bio-printing, pharma-printing, pharmaceutical applications, drug toxicity assays, life science applications, drug developments, clinical diagnosis, or a combination thereof, wherein the at least one first deposition-head is a slot die head comprising:

a pair of head-halves sealingly coupled to each other, a manifold configured on at least one of the pair of head-halves and fluidically coupled to the at least one inlet, a shim arranged between the pair of head-halves for spacing apart the pair of head-halves, and a meniscus guide arranged adjacent to the shim and between the pair of head-halves, and wherein at least one of the shim and the meniscus guide is made of a flexible material including but not limited to silicon or rubber.

12. The method according to claim 11, further comprising receiving two or more deposition materials, by two or more inlets of the at least one inlet, in the simultaneous manner to perform layer deposition of the two or more deposition materials simultaneously to form the stacked layers thereof.

13. The method according to claim 11, wherein the two or more deposition materials are received by the two or more inlets at a gap of pre-determined interval of time, distance or volume causing the at least one first deposition-head to perform the layer deposition of the two or more deposition materials at the gap of pre-determined interval of time.

14. The method according to claim 11, further comprising applying a potential difference between the at least one first deposition-head and a substrate, on which the at least one first deposition-head deposits the plurality of deposition materials, for employing an electro-melting or a spraying deposition technique.

15. The method according to claim 11, further comprising:

providing at least one second deposition-head operable to perform point deposition, wherein the at least one second deposition-head is coupled to the at least one first deposition-head to form a combined deposition-head-unit or the at least one second deposition-head is spaced apart from the at least one first deposition-head to form modular units of the at least one first and second deposition-heads.

16. The method according to claim 11, further comprising receiving a plurality of deposition materials, by the least one second deposition-head, in at least one of a selective manner or a simultaneous manner, wherein when the at least one second deposition-head receives the plurality of deposition materials in the selective manner the at least one second deposition-head is operable to perform the point deposition of a single line or stacked lines of individual deposition material of the plurality of deposition materials, and wherein when the at least one second deposition-head receives the plurality of deposition materials in the simultaneous manner the at least one second deposition-head is operable to perform the point deposition of a single line or stacked lines of mixed deposition material of the plurality of deposition materials.

17. The method according to claim 11, further comprising performing a subtractive technique, on deposition performed by the at least one first deposition-head and the at least one second deposition-head, by a cutting unit.

* * * * *